(12) United States Patent
Ishiwata

(10) Patent No.: US 10,755,468 B2
(45) Date of Patent: Aug. 25, 2020

(54) IMAGE PROCESSING APPARATUS, IMAGE PROCESSING METHOD, AND PROGRAM TO IMPROVE SPEED FOR CALCULATING A COLOR OF PIXELS IN IMAGE DATA

(71) Applicant: Sony Interactive Entertainment Inc., Tokyo (JP)

(72) Inventor: Tatsuya Ishiwata, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/345,274

(22) PCT Filed: Dec. 6, 2017

(86) PCT No.: PCT/JP2017/043816
§ 371 (c)(1),
(2) Date: Apr. 26, 2019

(87) PCT Pub. No.: WO2018/105655
PCT Pub. Date: Jun. 14, 2018

(65) Prior Publication Data
US 2019/0251732 A1    Aug. 15, 2019

(30) Foreign Application Priority Data

Dec. 9, 2016  (JP) .................. 2016-239308

(51) Int. Cl.
*G06T 15/00*   (2011.01)
*G06T 7/90*    (2017.01)
(Continued)

(52) U.S. Cl.
CPC .......... *G06T 15/005* (2013.01); *G06K 9/342* (2013.01); *G06T 1/20* (2013.01); *G06T 1/60* (2013.01); *G06T 7/90* (2017.01); *G06T 15/00* (2013.01)

(58) Field of Classification Search
None
See application file for complete search history.

(56) References Cited

U.S. PATENT DOCUMENTS 7,170,515 B1 * 1/2007 Zhu ................... G06T 15/005
                                                    345/422
8,780,124 B2   7/2014 Nishi
(Continued)

FOREIGN PATENT DOCUMENTS

JP         2012063922 A      3/2012

OTHER PUBLICATIONS

International Search Report for corresponding PCT Application No. PCT/JP2017/043816, 2 pages, dated Jan. 23, 2019.
(Continued)

*Primary Examiner* — Vu Nguyen
(74) *Attorney, Agent, or Firm* — Matthew B. Dernier, Esq.

(57) ABSTRACT

Methods and apparatus provide, for each partial area into which a display area is divided, determining multiple pixel groups including pixels overlapping a two-dimensional area; allocating the pixels belonging to the multiple pixel groups to any one of multiple processing groups that are each capable of including pixels whose number is smaller than or equal to a predetermined parallel number; calculating in parallel each color of pixels belonging to the processing group on the basis of the color calculation information stored in the memory; and outputting image data on the basis of the calculated color.

7 Claims, 11 Drawing Sheets

(51) Int. Cl.
*G06K 9/34* (2006.01)
*G06T 1/60* (2006.01)
*G06T 1/20* (2006.01)

(56) References Cited

U.S. PATENT DOCUMENTS

| | | |
|---|---|---|
| 2002/0171651 A1 | 11/2002 | Kurihara |
| 2003/0025701 A1 | 2/2003 | Kehlet |
| 2007/0159488 A1 | 7/2007 | Danskin |
| 2012/0062578 A1 | 3/2012 | Nishi |
| 2014/0292756 A1* | 10/2014 | Mantor ................ G06T 15/005 345/426 |
| 2016/0132338 A1 | 5/2016 | Jin |
| 2018/0165872 A1* | 6/2018 | Lefebvre ................ G06T 15/80 |

OTHER PUBLICATIONS

International Preliminary Report on patentability and Written Opinion for corresponding PCT Application No. PCT/JP2017/043816, 11 pages, dated Jun. 20, 2019.
Extended Search Report for corresponding EP Application No. 17877717.3, 9 pages, dated May 12, 2020.
Christopher Kubisch, "Life of a triangle NVIDIA's logical pipeline", NVIDIA Developer, 9 pages, Mar. 16, 2015.
Nvidia CUDA C Programming Guide Version 3.2, NVIDIA Corporation, 179 pages, Sep. 8, 2010.

\* cited by examiner

IMAGE PROCESSING APPARATUS, IMAGE PROCESSING METHOD, AND PROGRAM TO IMPROVE SPEED FOR CALCULATING A COLOR OF PIXELS IN IMAGE DATA

TECHNICAL FIELD

The present invention relates to an image processing apparatus, an image processing method, and a program.

BACKGROUND ART

In recent years, a processing speed of a graphic processing unit (GPU) becomes important to allow a display to display a high-definition three-dimensional image.

A general GPU divides a display area into multiple tiles and extracts a pixel that exists in an area in which each of the tiles and an area of a primitive such as a triangle overlap each other. Then, the GPU allocates the extracted pixel to any one of multiple parallel processing groups. Further, the GPU performs processing such as texture mapping or bump mapping on each group in parallel and calculates a color of each pixel.

Patent Document 1 discloses that a screen on which the primitive is displayed is divided into multiple blocks and each of the multiple blocks is associated with a bin. Further, Patent Document 1 discloses that the GPU detects the bin overlapping the primitive and allows a unified shader system to process a pixel belonging to the bin.

CITATION LIST

Patent Literature

[PTL 1] U.S. Patent Application Publication No. 2014/0292756

SUMMARY

Technical Problem

In the same manner as in texture mapping or bump mapping, for example, in a case in which data for calculating a color regarding multiple positions is stored in a memory and the color of a pixel is calculated using the data, even if a parallel degree is increased, a processing time may not be much shortened.

The present invention has been made in view of the above circumstances. An object of the present invention is therefore to improve a processing speed for calculating a color of a pixel using the data for calculating the color.

Solution to Problem

In order to solve the above-mentioned problem, an image processing apparatus according to the present invention includes: a rasterizer configured to determine, for each partial area into which a display area is divided, multiple pixel groups including pixels overlapping a two-dimensional area; a memory configured to store color calculation information regarding each position of the two-dimensional area; an allocation section configured to allocate the pixels belonging to the multiple pixel groups to any one of multiple processing groups that are each capable of including pixels whose number is smaller than or equal to a predetermined parallel number; a parallel calculation unit configured to calculate in parallel each color of the pixels belonging to the processing group on a basis of the color calculation information stored in the memory; and an image generation section configured to output image data on a basis of the calculated color. The allocation section allocates, for each of the pixel groups, the pixels to at least one of the multiple processing groups such that the number of processing groups to which the pixels belonging to the pixel group are allocated is a necessary minimum number.

Further, an image processing method according to the present invention is an image processing method of an apparatus, the apparatus including a memory configured to store color calculation information regarding each position of a two-dimensional area and a parallel calculation unit configured to calculate in parallel each color of pixels belonging to multiple processing groups that are each capable of including pixels whose number is smaller than or equal to a predetermined parallel number on a basis of the color calculation information stored in the memory. The image processing method includes: a step of determining, for each partial area into which a display area is divided, multiple pixel groups including pixels overlapping the two-dimensional area; a step of allocating the pixels belonging to the multiple pixel groups to any one of the multiple processing groups; and a step of outputting image data on a basis of the color calculated by the parallel calculation unit. In the step of allocating the pixels, for each of the pixel groups, the pixels are allocated to at least one of the multiple processing groups such that the number of processing groups to which the pixels belonging to the pixel group are allocated is a necessary minimum number.

Further, a program according to the present invention causes a computer to execute, the computer including a memory configured to store color calculation information regarding each position of a two-dimensional area and a parallel calculation unit configured to calculate in parallel each color of pixels belonging to multiple processing groups that are each capable of including pixels whose number is smaller than or equal to a predetermined parallel number on a basis of the color calculation information stored in the memory, and the computer outputting image data on a basis of the color calculated by the parallel calculation unit: a step of determining, for each partial area into which a display area is divided, multiple pixel groups including pixels overlapping the two-dimensional area; and a step of allocating the pixels belonging to the multiple pixel groups to any one of the multiple processing groups. In the step of allocating the pixels, for each of the pixel groups, the pixels are allocated to at least one of the multiple processing groups such that the number of processing groups to which the pixels belonging to the pixel group are allocated is a necessary minimum number.

According to the present invention, a processing speed for calculating a color of a pixel can be improved using data for calculating the color.

Further, in a mode of the present invention, positions of the color calculation information continuously stored in the memory are not separated from each other.

Further, in a mode of the present invention, the allocation section, in a case in which the number of pixels allocated to a processing group is smaller than the predetermined parallel number and a number obtained by subtracting the number of the allocated pixels from the predetermined parallel number is greater than the number of unallocated pixels belonging to another pixel group, may allocate the pixels belonging to the another pixel group to the processing group.

Further, in a mode of the present invention, the allocation section may: calculate as an empty number a number obtained by subtracting the number of pixels belonging to a processing group to which the pixels are allocated immediately before from the parallel number, in a case in which a remainder obtained by dividing the number of pixels belonging to a subsequent pixel group by the parallel number is smaller than the empty number, allocate the pixels by the number of the remainder to the processing group to which pixels are newly allocated, and in a case in which the remainder obtained by dividing the number of the pixels belonging to the subsequent pixel group by the parallel number is greater than the empty number, allocate the pixels belonging to the subsequent pixel group to one or multiple new processing groups.

Further, in a mode of the present invention, the allocation section may: allocate pixels of the parallel number included in a pixel group in which the number of pixels is greater than the parallel number to respective processing groups, in a case in which the number of pixels of any one of the pixel groups having unallocated pixels is smaller than or equal to an empty number of a processing group, allocate the unallocated pixels belonging to the any one of the pixel groups to the processing group, and in a case in which all the numbers of the pixels of the pixel groups having the unallocated pixels are greater than the empty number of the processing group, generate a new processing group to which the pixels of any one of the pixel groups are allocated.

DESCRIPTION OF EMBODIMENT

Hereinafter, an embodiment of the present invention will be described with reference to the appended drawings. Hereinafter, component elements having the same functions are denoted with the same reference signs, and repeated explanation of these component elements is omitted.

Figure 1:
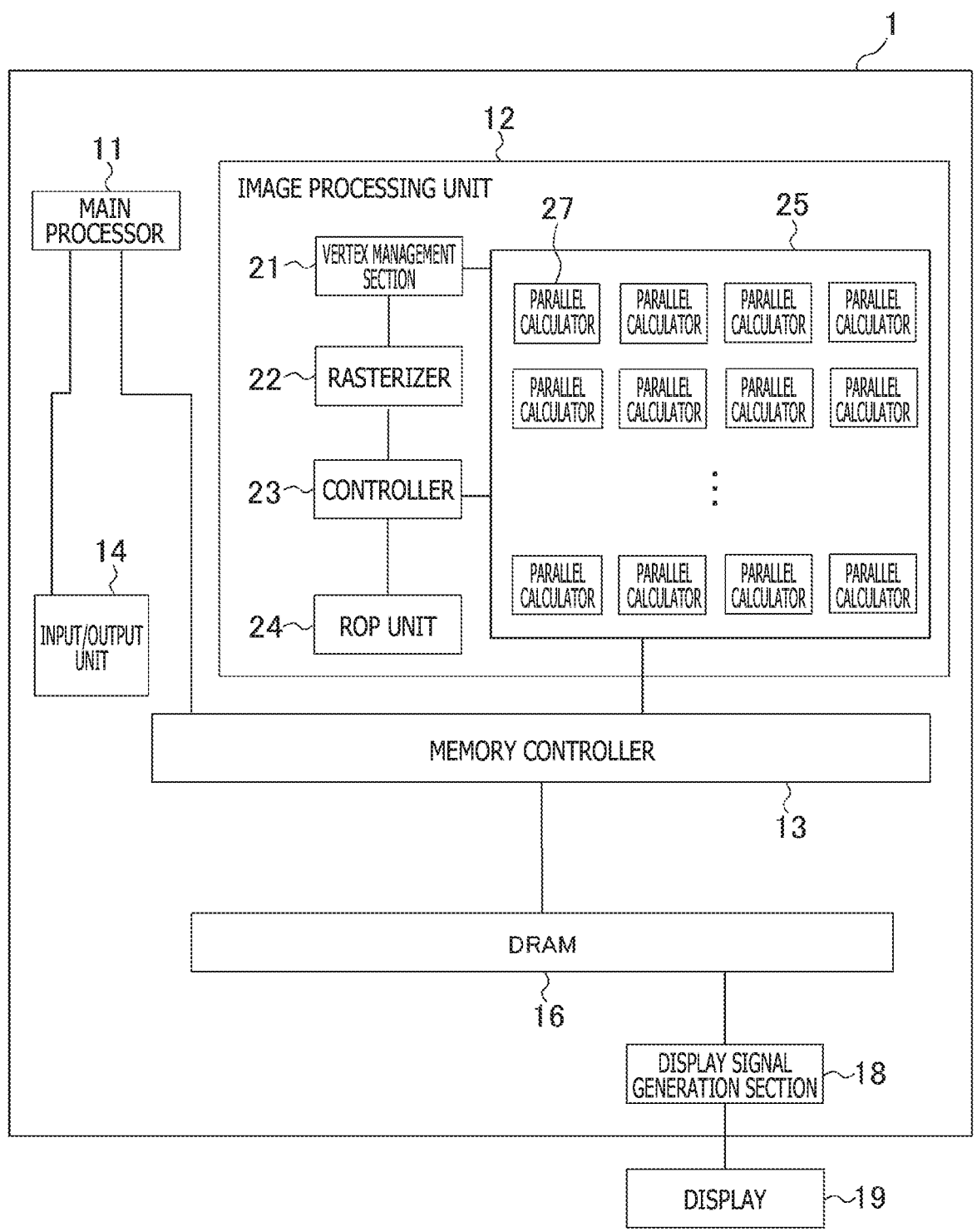
FIG. 1 is a diagram illustrating an example of a hardware configuration of an image processing apparatus according to an embodiment of the present invention.

FIG. 1 is a diagram illustrating an example of a hardware configuration of an image processing apparatus 1 according to an embodiment of the present invention. The image processing apparatus 1 is a personal computer, a home-use game machine, a tablet terminal, or the like. The image processing apparatus 1 includes a main processor 11, an image processing unit 12, a memory controller 13, an input/output unit 14, a dynamic random access memory (DRAM) 16, and a display signal generation section 18.

The main processor 11 operates in accordance with a program stored in the DRAM 16 and controls the image processing unit 12, the input/output unit 14, and the like. Note that the program may be stored in a computer readable storage medium such as a flash memory for provision and may be provided via a network such as the Internet.

The image processing unit 12 is a portion for achieving a principal function of a so-called GPU. The image processing unit 12 includes a vertex management section 21, a rasterizer 22, a controller 23, a raster operation (ROP) unit 24, and a shader unit 25.

The vertex management section 21 performs processing for converting three-dimensional local coordinates into global coordinates and processing for generating two-dimensional coordinates on a display plane when viewed from a viewpoint from three-dimensional coordinates in cooperation with the shader unit 25. Thereby, the vertex management section 21 generates a two-dimensional area into which a three-dimensional shape is converted.

On the basis of the generated two-dimensional coordinates, the rasterizer 22 determines, for each of partial areas (hereinafter, described as "tiles") into which a display area is divided, a pixel group including multiple pixels overlapping the two-dimensional area among pixels belonging to the tiles. Hereinafter, the pixel belonging to the pixel group determined concerning a certain tile is described as a pixel belonging to the tile.

On the basis of the pixel group of each tile determined by the rasterizer 22, the controller 23 performs processing for calculating a color of the pixel belonging to the pixel group in cooperation with the shader unit 25. Note that the controller 23 may be a processor that executes a general program. Alternatively, the controller 23 may perform an operation corresponding to the vertex management section 21 using a program.

The shader unit 25 includes multiple parallel calculators 27. Each of the parallel calculators 27 can perform in parallel a predetermined number (hereinafter, described as a "parallel number P") of processes for one instruction. The parallel calculator 27 is a calculation apparatus for so-called single instruction multiple data (SIMD). Through control of the vertex management section 21, the shader unit 25 converts the three-dimensional coordinates into the two-dimensional coordinates on the display plane when viewed from a certain viewpoint. Further, through control of the controller 23, the shader unit 25 accesses data within the DRAM 16 and calculates colors of pixels constituting the two-dimensional area. The shader unit 25 may have a cache memory.

On the basis of colors of pixels concerning multiple two-dimensional areas, which are calculated by the controller 23 and the shader unit 25, the ROP unit 24 synthesizes images in the multiple two-dimensional areas and outputs data of a display image to a so-called frame buffer.

Note that the image processing unit 12 may include multiple sets of the vertex management section 21, the rasterizer 22, the controller 23, the ROP unit 24, and the shader unit 25.

The memory controller 13 controls access of reading/writing from the main processor 11 into the DRAM 16 or access of reading/writing from the image processing unit 12 into the DRAM 16. The memory controller 13 converts an address that is accessed by the main processor 11 or the image processing unit 12 into a signal (a row or a column) for specifying an access destination of the DRAM 16. In addition, the memory controller 13 reads out data that is positioned within the DRAM 16 specified by the converted signal and writes the data in the position within the DRAM 16. Although not illustrated in the drawing, the memory controller 13 is connected to the cache memory that operates at a higher speed. Using the cache memory, repeatedly accessed data can be read out at a high speed.

The input/output unit 14 connects the main processor 11 to a communication device and an input/output device (not illustrated). Examples of the communication device include an integrated circuit or a terminal constituting a wired local area network (LAN) and an integrated circuit or an antenna constituting a wireless LAN. Further, examples of the input/output device include a keyboard, a pointing device, and an audio device.

Note that the main processor 11, the image processing unit 12, the memory controller 13, and the input/output unit 14 may be stored in the same package.

The DRAM 16 stores programs or data necessary for image generation for displaying, for example, data (hereinafter, described as a "pattern") such as a three-dimensional texture or a bump map. In addition, the DRAM 16 stores also data regarding the frame buffer. In the example illustrated in FIG. 1, the memory controller 13 and the DRAM 16 are illustrated as if they are common to the main processor 11 and the image processing unit 12. By contrast, the main controller 13 and the DRAM 16 may be separately provided for the main processor 11 and the image processing unit 12. Alternatively, the frame buffer may be stored in a memory device different from the DRAM 16. Note that the DRAM 16 may be constituted by multiple chips.

On the basis of image data stored in the frame buffer, the display signal generation section 18 generates a display signal and outputs the display signal to the display 19 to thereby allow the display 19 to display an image. The display 19 is, for example, a television apparatus outside the image processing apparatus 1 or a display device incorporated in the image processing apparatus 1.

Figure 2:
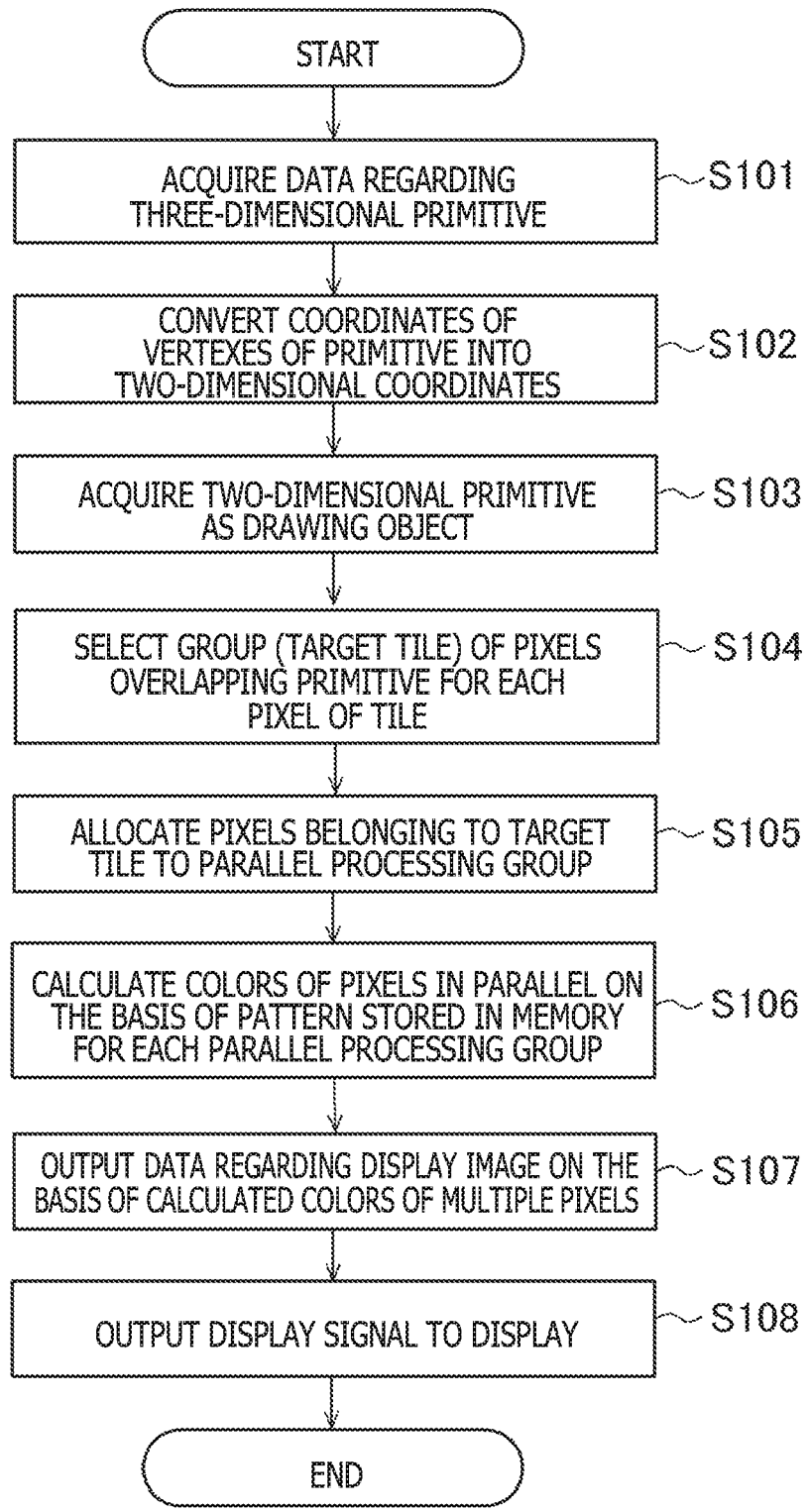
FIG. 2 is a flow diagram schematically illustrating an example of processes performed by the image processing apparatus.

FIG. 2 is a flow diagram schematically illustrating an example of processes performed by the image processing apparatus 1. In FIG. 2, there is illustrated an example in which the image processing apparatus 1 converts one or multiple primitives constituting the three-dimensional shape into the two-dimensional area and calculates a color of a pixel on the converted area. The primitive is a figure a position or a shape of which can be specified using a simple parameter like a vertex, a center, or a radius, for example, in the same manner as in a polygon such as a triangle or a circular plate disposed in a three-dimensional space. The main processor 11 prepares data in advance and the image processing unit 12 calculates the data on the basis of a command from the main processor or programs to thereby achieve the processes illustrated in FIG. 2. Detailed descriptions of steps of preparing the data and giving a command by the main processor 11 will be omitted.

First, the vertex management section 21 acquires data regarding a three-dimensional primitive from the DRAM 16 (step S101). The data regarding the three-dimensional primitive is, for example, coordinates of vertexes of the polygon.

Secondly, the vertex management section 21 controls the shader unit 25 and allows the shader unit 25 to convert coordinates of vertexes of the primitive into the two-dimensional coordinates on the display plane when viewed from the viewpoint (step S102). Here, in a case in which coordinates of the vertexes of the primitive are indicated using a local coordinate system, the vertex management section 21 may convert the coordinates of the vertexes into a global coordinate system and further convert the global coordinate system into the two-dimensional coordinates using calculation of the shader unit 25. The conversion from the three-dimensional coordinates into the two-dimensional coordinates on the display plane is called a perspective projection. Since the conversion is a well-known technique, a detailed description is omitted. The vertex management section 21 acquires information indicative of the converted two-dimensional coordinates and thereby acquires a two-dimensional primitive as a drawing object (step S103).

Next, the rasterizer 22 selects, for each of the tiles, a group including pixels overlapping the primitive (step S104). Here, the tiles are partial areas into which the display area is divided, and each tile is a rectangular area. In the display area, for example, tiles of a row a and a column b (a and b are positive integers) are arranged. The tile may be triangular etc. in shape. Hereinafter, the selected group including pixels is described also as a target tile and a pixel belonging to the pixel group is described as a pixel belonging to the target tile.

Figure 3:
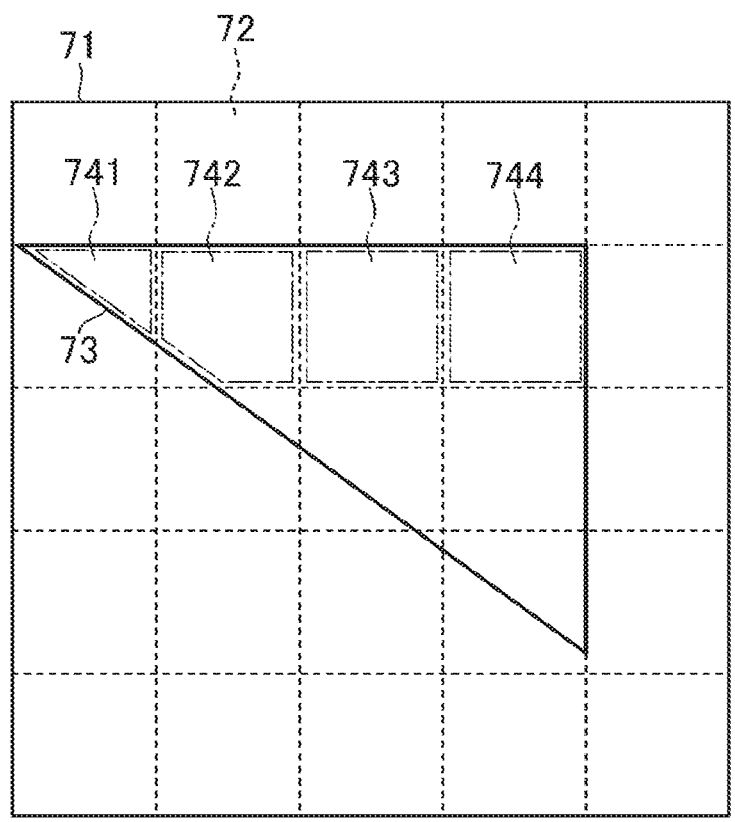
FIG. 3 is a diagram illustrating an example of a primitive generated within a display area.

FIG. 3 is a diagram illustrating an example of the primitive generated within the display area. In FIG. 3, a display area 71, rectangular tiles 72, and a primitive 73 are schematically illustrated. The number of the tiles 72 is practically greater than that illustrated in FIG. 3. In FIG. 3, the primitive 73 is a right triangle and overlaps some of the tiles 72. For four tiles 72 on the left side of a second row from the top, the rasterizer 22 determines respective target tiles 741, 742, 743, and 744 including pixels in an area overlapping the primitive 73. The rasterizer 22 determines the target tiles 74 for the other tiles 72.

When the target tiles 74 are determined by the rasterizer 22, the controller 23 allocates pixels belonging to the target tiles 74 to one or multiple parallel processing groups 81 (step S105). Here, the parallel processing group 81 is a group of multiple threads that can be collectively calculated in parallel by the parallel calculators 27 and the maximum number of threads is a parallel number P. In the present embodiment, since processing of one pixel is performed by one thread, even the number of pixels allocated to one parallel processing group is equivalent to the parallel number P. Note that in a case in which multiple pixels are processed using one thread, or the like, the maximum number of pixels allocated to one parallel processing group may be different from the parallel number P for the processing. Details of the process of step S105 will be described below.

When pixels are allocated to parallel processing groups 81, the parallel calculators 27 included in the shader unit 25 calculate colors of the pixels allocated to the parallel processing groups 81 in parallel for each of the parallel processing groups 81 on the basis of a pattern stored in a memory (step S106). The processes of calculating the colors include a process of so-called texture mapping or bump mapping and is well known, and therefore the detailed description will be omitted.

Figure 4:
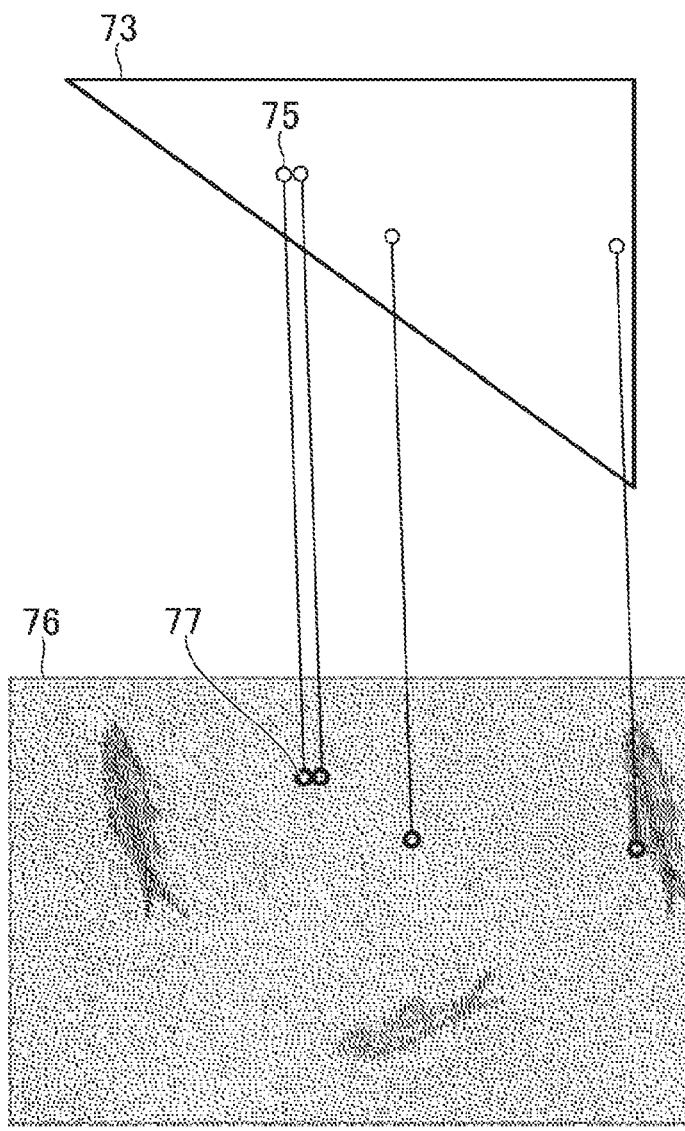
FIG. 4 is a diagram illustrating an example of correspondence between a pattern and the primitive.

FIG. 4 is a diagram illustrating an example of correspondence between a pattern 76 and a three-dimensional primitive 73. In an example illustrated in FIG. 4, the pattern 76 has a predetermined two-dimensional external shape and multiple texels 77 are provided in the pattern 76. In the example illustrated in FIG. 4, the pattern 76 is a so-called texture and includes color information regarding each of the texels 77. The pattern 76 may be a bump map used for the bump mapping. In this case, the pattern 76 includes height difference information or information regarding normal lines of each of the texels 77. Further, positions 75 on a plane within the primitive 73 and the texels 77 within the pattern 76 are associated with each other in advance. Further, a position within the primitive 73 corresponding to a pixel in the two-dimensional area into which the primitive 73 is converted is uniquely calculated. Therefore, a position of the pixel within the two-dimensional area is associated even with the texel 77. The pattern 76 is color calculation information such as a color, a height difference, or a normal line in each position within the two-dimensional area. Further, the pattern 76 stored in the memory has a data structure such that the color calculation information regarding a near texel 77 is stored in a nearer address. Positions of the color calculation information continuously stored in the DRAM 16 are not separated from each other. For example, color information regarding a texel in a rectangular area in which one side of the pattern 76 is power of 2 is stored in a continuous address.

When a color of the pixel is calculated, the ROP unit 24 outputs data regarding the display image to the frame buffer on the basis of the calculated color of the pixel in the two-dimensional area (step S107). Note that the data regarding the image may be output as a texture etc. to other memories in place of the frame buffer. Further, the display signal generation section 18 generates a display signal to be output to the display from display image data output to the frame buffer and outputs the display signal to the display (step S108).

Figure 5:
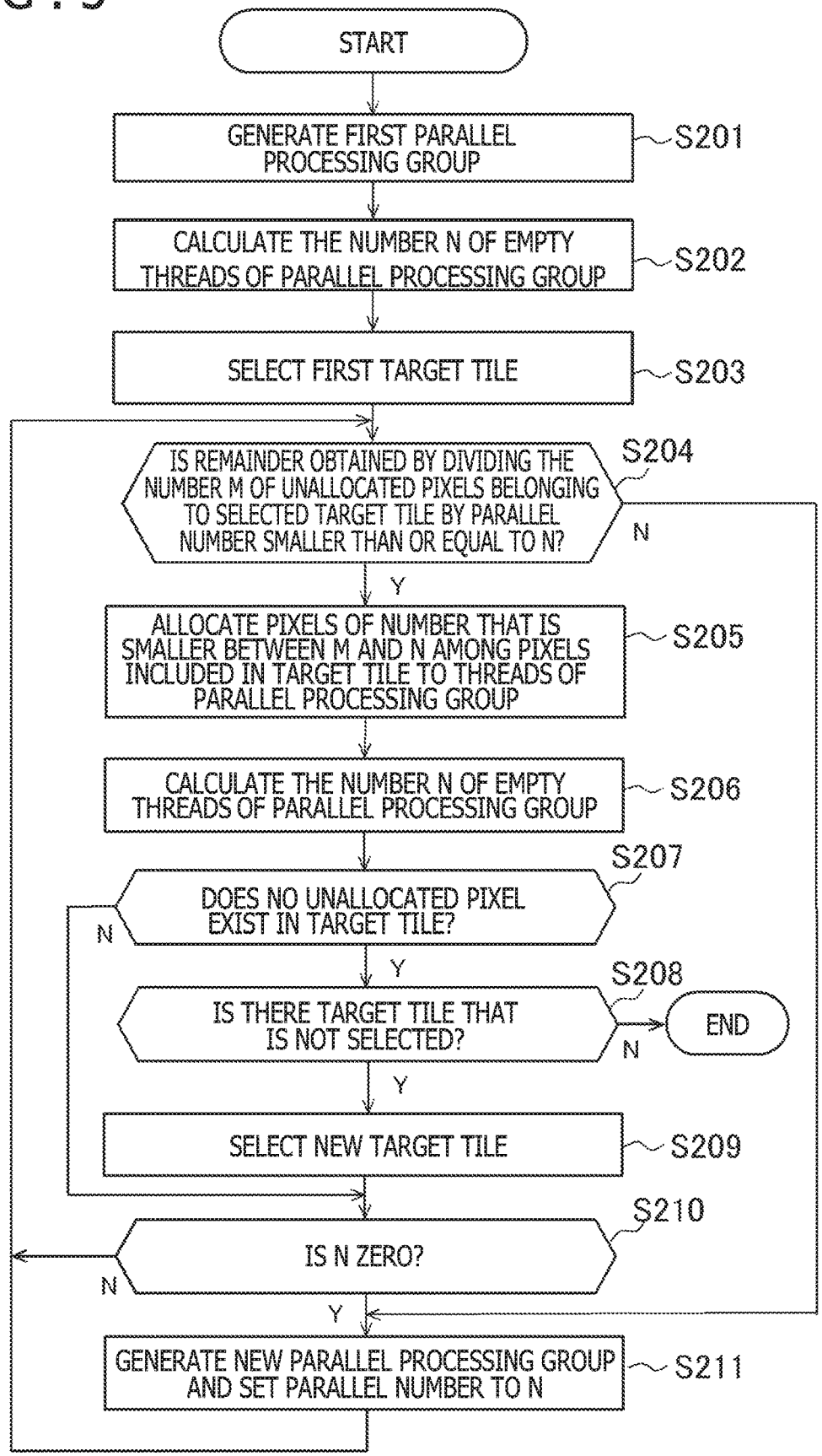
FIG. 5 is a flow diagram illustrating an example of processes in which a controller allocates pixels to parallel processing groups.

Next, the process of step S105 will be described in more detail. FIG. 5 is a flow diagram illustrating an example of processes in which the controller 23 allocates pixels to parallel processing groups. Note that the processes are performed by executing programs by the controller 23. The controller 23 may perform the processes illustrated in FIG. 5 for each of the two-dimensional areas generated from the primitive 73. Alternatively, the controller 23 may collectively perform the processes for the multiple two-dimensional areas generated from the primitive 73. Further, in a case in which the target tiles are allocated to each of the multiple parallel calculators 27, the processes illustrated in FIG. 5 may be performed for each of the parallel calculators 27.

First, the controller 23 generates a first parallel processing group 81 (step S201). The controller 23 does not issue a command for performing the process concerning the parallel processing group at this moment. Further, the controller 23 calculates the number N of empty threads in the parallel processing group 81 for use in subsequent processes (step S202). The controller 23 selects a first target tile (step S203).

Then, the controller 23 calculates a remainder obtained by dividing the number M of unallocated pixels belonging to the selected target tile by the parallel number P (step S204). If the remainder is greater than N (N in step S204), the controller 23 skips the following processes from step S205 to step S210 and performs the after-mentioned process of step S211.

On the other hand, if the remainder is smaller than or equal to N (Y in step S204), the controller 23 performs the processes of step S205 and subsequent steps. In step S205, some of the unallocated pixels included in the target tile are allocated to threads of the parallel processing group 81 (step S205). Here, the number of the allocated pixels is the number that is the smaller between M and N. Further, it is assumed that one pixel is allocated to one thread.

Then, the controller 23 calculates the number N of the empty threads in the parallel processing group 81 after the allocation (step S206). More concretely, the number N of the empty threads is a number obtained by subtracting the number of pixels allocated to the parallel processing group 81 from the parallel number. The controller 23 may simply subtract the number of pixels allocated this time from N before the allocation to calculate the number N of the empty threads.

Then, the controller 23 determines whether or not unallocated pixel exists in the target tile (step S207). If unallocated pixel exists (N in step S207), the controller 23 skips the processes from step S207 to step S209. If no unallocated pixel exists (Y in step S207), the controller 23 determines whether or not a target tile or tiles that are not selected exist (step S208). If the no target tile that is not selected exists (N in step S208), since the processes have been performed in all the target tiles, the controller 23 completes the process of step S105. On the other hand, if a target tile or tiles that are not selected exist (Y in step S208), the controller 23 selects a new target tile from the target tiles that are not selected (step S209) and proceeds to the process of step S210.

In step S210, the controller 23 determines whether or not the number N of the empty threads in the parallel processing group is zero (step S210). If N is zero (Y in step S210), the controller 23 generates a new parallel processing group 81 and sets the parallel number as the number N of the empty threads (step S211). Then, the controller 23 repeats the processes from step S204. On the other hand, if N is not zero, the controller 23 repeats the processes from step S204 without performing the process of step S211 (N in step S210).

Through the processes illustrated in FIG. 5, the controller 23 allocates, for each target tile, pixels to the parallel processing groups 81 such that conditions in which the number of the parallel processing groups to which the pixel belonging to the target tile is allocated is a necessary minimum number are satisfied. More concretely, when the number of pixels included in a certain target tile is set to T, the number K of the parallel processing groups to which the pixel belonging to the target tile is allocated satisfies the following formula.

$$K=\mathrm{Ceil}(T/P)$$

Here, Ceil (x) is a function for calculating a minimum integer greater than or equal to x. Thereby, the pixel belonging to the target tile exists in the parallel processing groups of the necessary minimum number.

Figure 6:
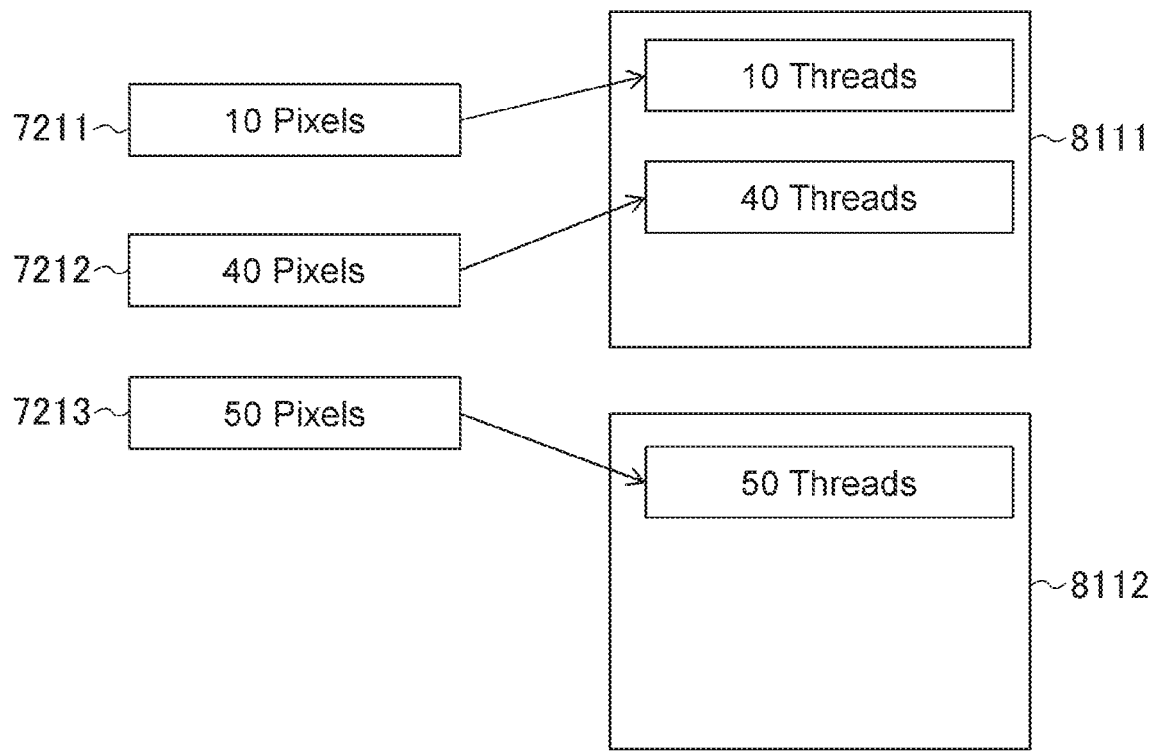
FIG. 6 is a diagram illustrating an example of allocation of the pixels to the parallel processing groups.

FIG. 6 is a diagram illustrating an example of allocation of pixels to the parallel processing groups 81. FIG. 6 illustrates an example in a case in which, through the processes illustrated in FIG. 5, the parallel number P is 64 and 10, 40, and 50 pixels belonging to three target tiles 7211, 7212, and 7213, respectively, are allocated to the parallel processing groups 8111 and 8112. In the example illustrated in FIG. 6, the number of the parallel processing groups 81 to which pixels belonging to the same target tile are allocated is one. Further, the pixels belonging to the target tiles 7211 and 7212 are allocated to one parallel processing group 8111.

Then, in parallel calculation in step S106, a memory access can be made efficient. In general, addresses in a memory of the texels 77 corresponding to the pixels belonging to the same target tile are close to each other. By contrast, in the memory access to the DRAM 16 or the like, burst reading is performed. Therefore, when the memory access is access to a near address, data can be read out by a small number of times of the access to the DRAM 16. Further, even if data cannot be read out from the DRAM 16 at the same time, the access can be performed in a shorter time when an address gets near to some extent owing to circumstances of hardware such as caches or address specification. In a recent GPU, a calculation speed becomes high due to parallel degree improvement and the memory easily becomes a bottleneck. Under such conditions, the entire processing speed can be improved effectively owing to efficiency of the memory access.

Figure 7:
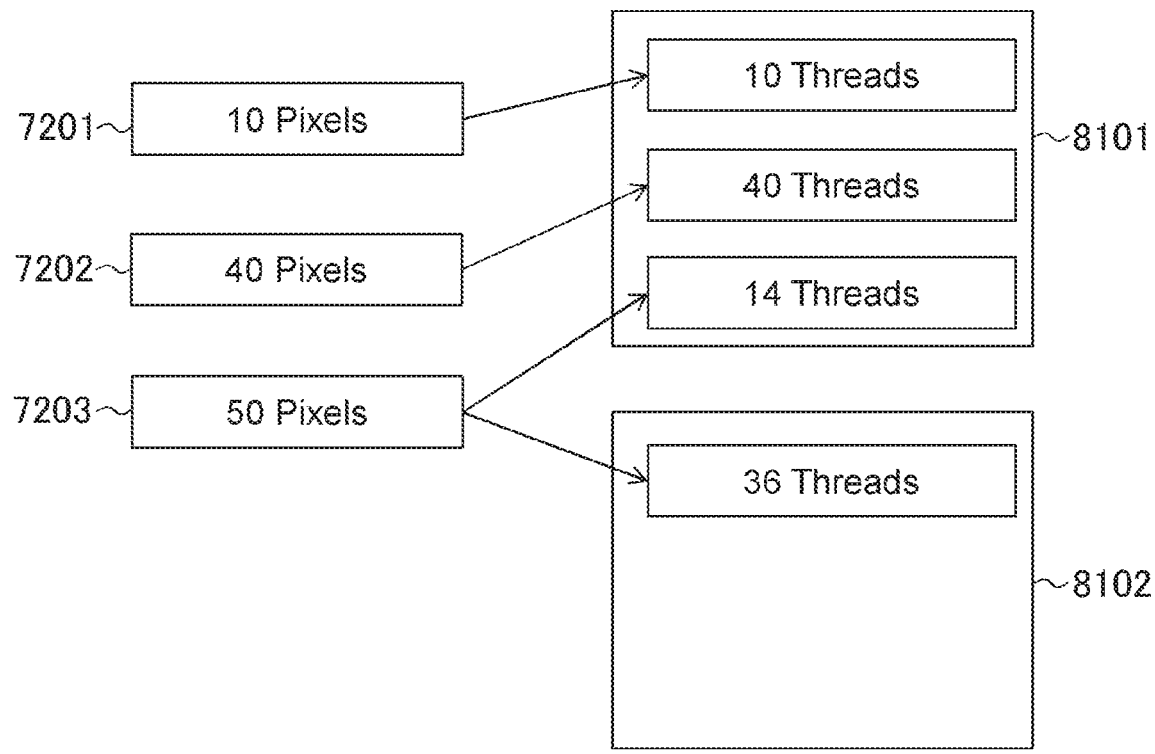
FIG. 7 is a diagram illustrating a comparison example of allocation of pixels to parallel processing groups.

FIG. 7 is a diagram illustrating a comparison example of the allocation of pixels to the parallel processing groups 81. In the example illustrated in FIG. 7, the pixels belonging to the target tiles 7201, 7202, and 7203 having the same configuration as that illustrated in FIG. 6 are allocated by an algorithm in which the number of the empty threads of the precedent parallel processing groups 81 is minimized. In this case, pixels belonging to one target tile 7203 are allocated to multiple parallel processing groups 8101 and 8102. In the process of step S106, through the process of the parallel processing group 8101 and the process of the parallel processing group 8102, two memory accesses may be needed in contrast to one memory access in the example illustrated in FIG. 6, which results in that the processing speed is liable to be reduced.

Figure 8:
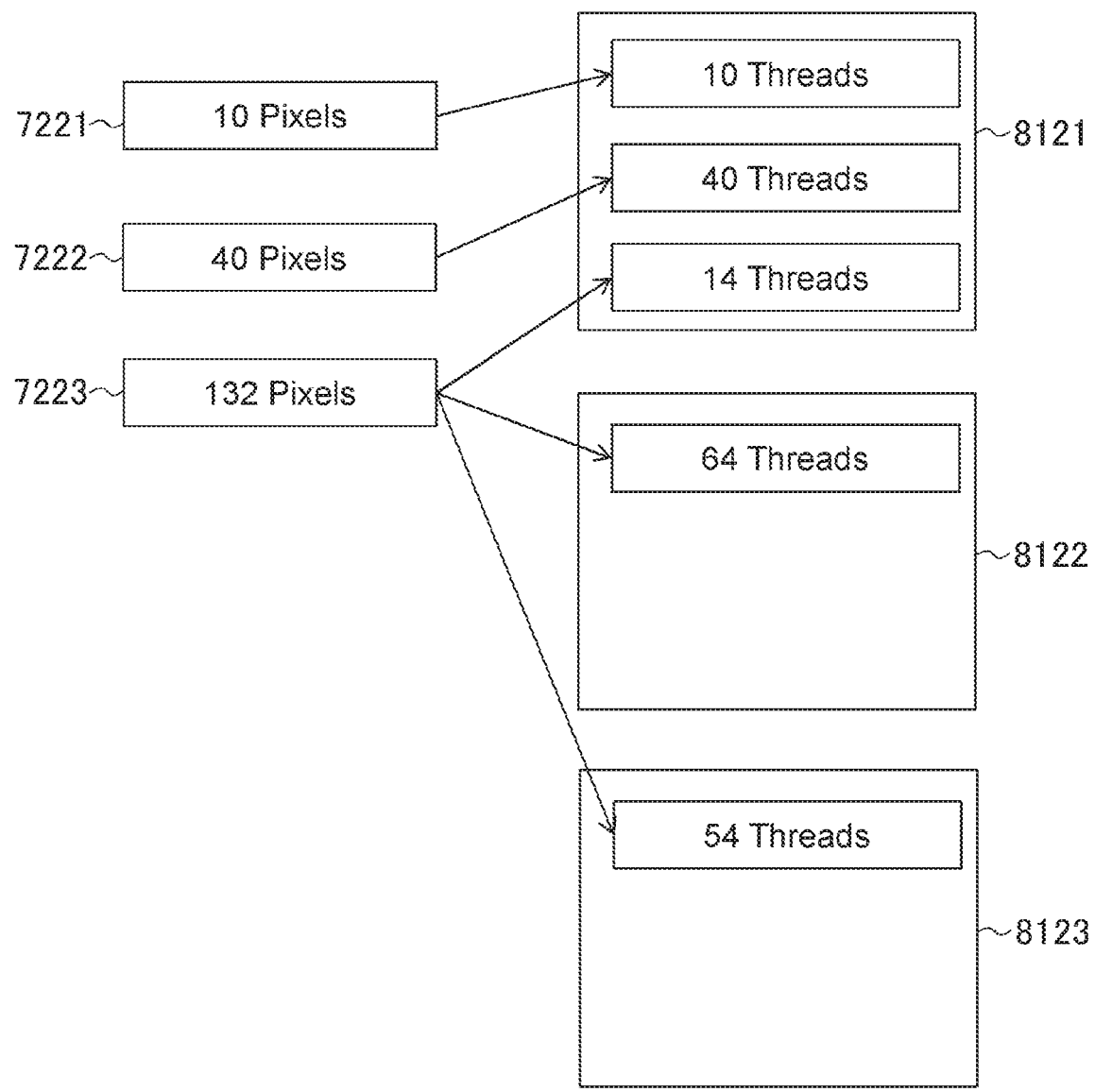
FIG. 8 is a diagram illustrating another example of allocation of pixels to parallel processing groups.

FIG. 8 is a diagram illustrating another example of the allocation of pixels to the parallel processing groups 81. FIG. 8 illustrates an example in a case in which 10, 40, and 132 pixels belonging to three target tiles 7221, 7222, and 7223, respectively, are allocated to parallel processing groups 8121 and 8122 through the processes illustrated in FIG. 5. In the example illustrated in FIG. 8, the number of the pixels belonging to the target tile 7223 is 132 and further the number of the parallel processing groups 8121, 8122, and 8123 to which the above pixels are allocated is three. By contrast, the pixels belonging to the three target tiles 7221 and 7222 and some of the pixels belonging to the target tile 7223 are allocated to the same parallel processing group 8121.

The controller 23 controls pixels belonging to multiple target tiles to be allocated to one parallel processing group while minimizing the number of the parallel processing groups to which pixels belonging to a certain target tile are allocated. Thereby, the parallel degree of processing can be improved more than a case in which the parallel processing group 81 is simply formed for each target tile. Further, an adverse effect due to an increase in the number of the parallel processing groups can be suppressed and the processing speed can be improved more definitely.

Figure 9:
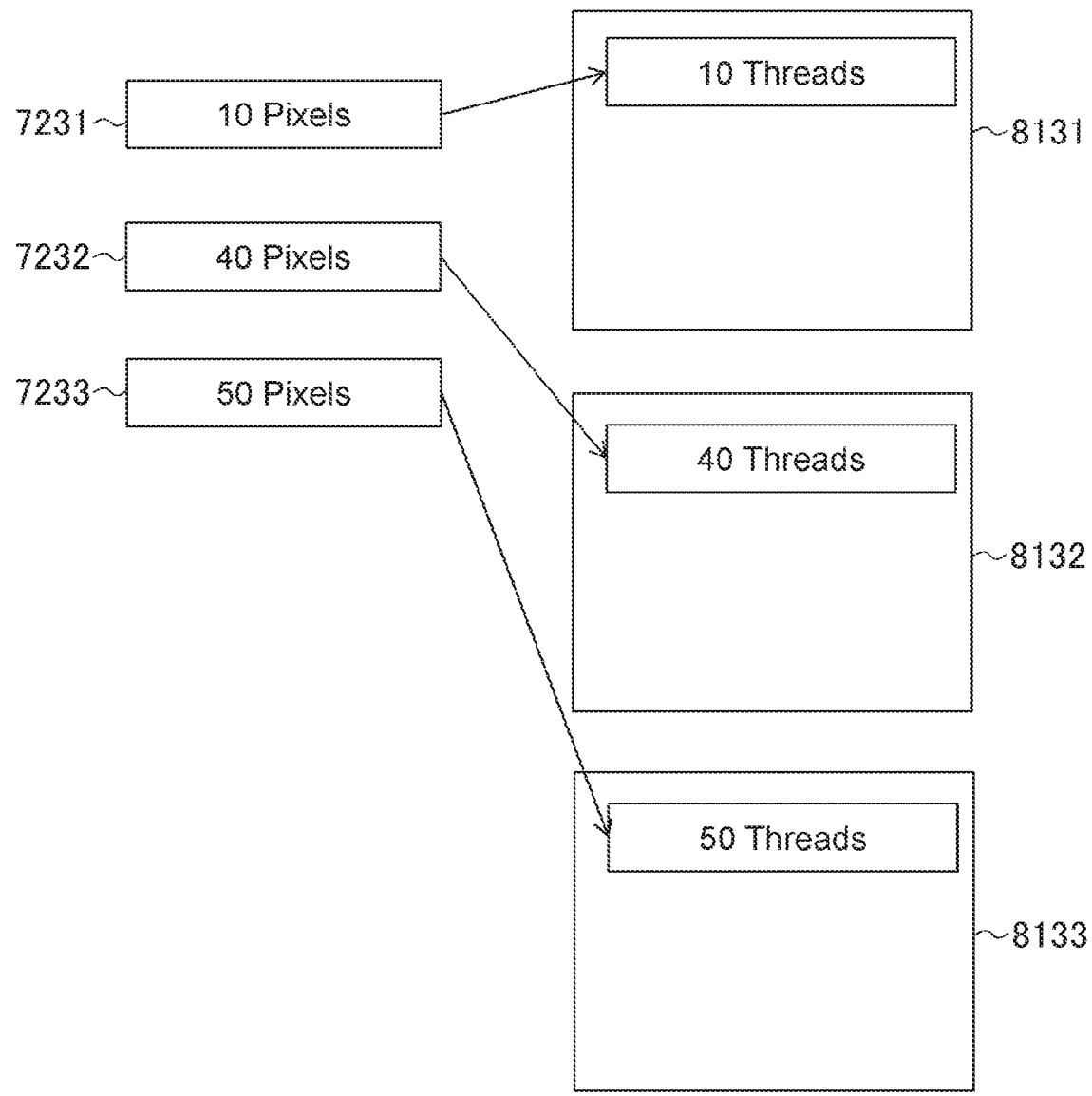
FIG. 9 is a diagram illustrating another example of allocation of pixels to parallel processing groups.

Note that, although the parallel degree is reduced, pixels belonging to one target tile may be allocated to each of the parallel processing groups 81. FIG. 9 is a diagram illustrating another example of the allocation of pixels to the parallel processing groups 81. In the example illustrated in FIG. 9, the pixels belonging to one target tile are allocated to each of the parallel processing groups 8131, 8132, and 8133.

Figure 10:
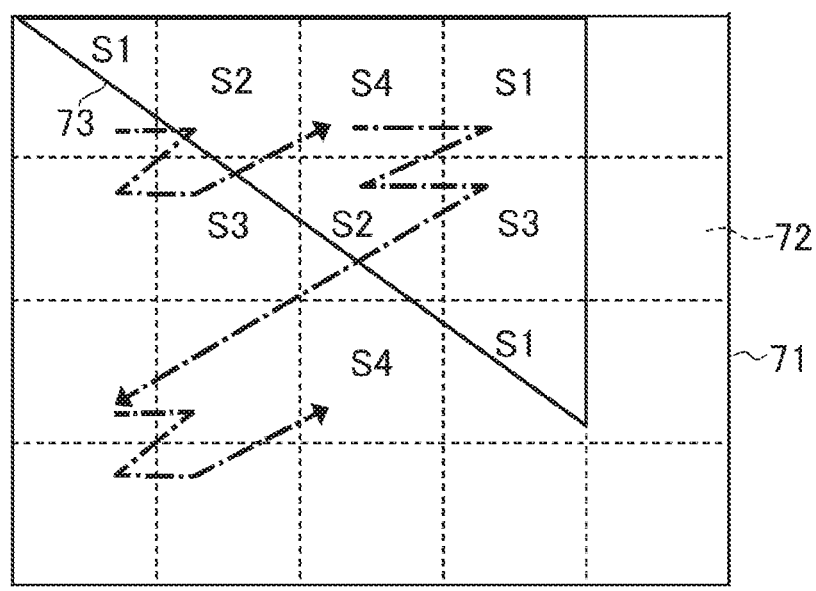
FIG. 10 is a diagram illustrating an example of an area to be processed by a parallel calculator.

Note that positions of the target tiles whose order numbers are consecutive to each other in a certain parallel calculator 27 are not always adjacent to each other. FIG. 10 is a diagram illustrating an example of an area to be processed by the parallel calculator 27. FIG. 10 illustrates an example of the allocation of the tiles in the case of using four parallel calculators 27. Further, signs S1 to S4 indicate IDs for specifying the parallel calculator 27 to which the target tile to which the sign is given is allocated. Further, an arrow with a dashed line indicates an order in which the rasterizer 22 processes the tiles. The order for processing the tiles may be different from that in the example illustrated in FIG. 10.

In the example illustrated in FIG. 10, the target tiles are allocated to the parallel calculators 27 in round-robin. Therefore, the positions of the target tiles do not lie side-by-side with each other when focusing on a certain parallel calculator 27. Therefore, there is reduced a possibility that the memory access is performed at the same time in pixels belonging to different target tiles. Under such conditions, a difference of efficiency in the memory access further becomes larger between a case in which the present invention is implemented and a case in which the present invention is not implemented. Therefore, an effect of greater speed improvement can be obtained.

In addition, according to the present embodiment, not only the efficiency in the memory access but also the improvement in the processing speed itself is expectable. For example, in a case in which the pattern 76 stored in the DRAM 16 is a bump map, branch processing may be performed in accordance with a direction of the normal line to indicate shades. In this case, in the case of the parallel calculation, when a branch destination is different depending on the pixel in the branch processing, processing of the branch destination needs to be divided into two before calculation. In the present embodiment, a possibility that the number of the target tiles belonging to one parallel processing group is one becomes high. By contrast, a possibility that directions of the normal lines of pixels belonging to the same target tile are similar on the basis of locality of the pattern becomes high, and therefore a possibility that multiple branch destinations are generated can be reduced.

If the maximum value of the number of the pixels included in the target tile is the same as the parallel number, the processes illustrated in FIG. 5 may be simplified. In this case, in the process of step S204, it is simply determined whether or not the number M of the unallocated pixels is smaller than or equal to N. In the process of step S205, N pixels are simply allocated to threads of the parallel processing group, and step S207 is unnecessary.

Here, in step S105, the controller 23 may perform, for each target tile, processing for further enhancing the parallel degree while satisfying conditions that the number of the parallel processing groups to which the pixels belonging to the target tile are allocated is the necessary minimum number.

Figure 11:
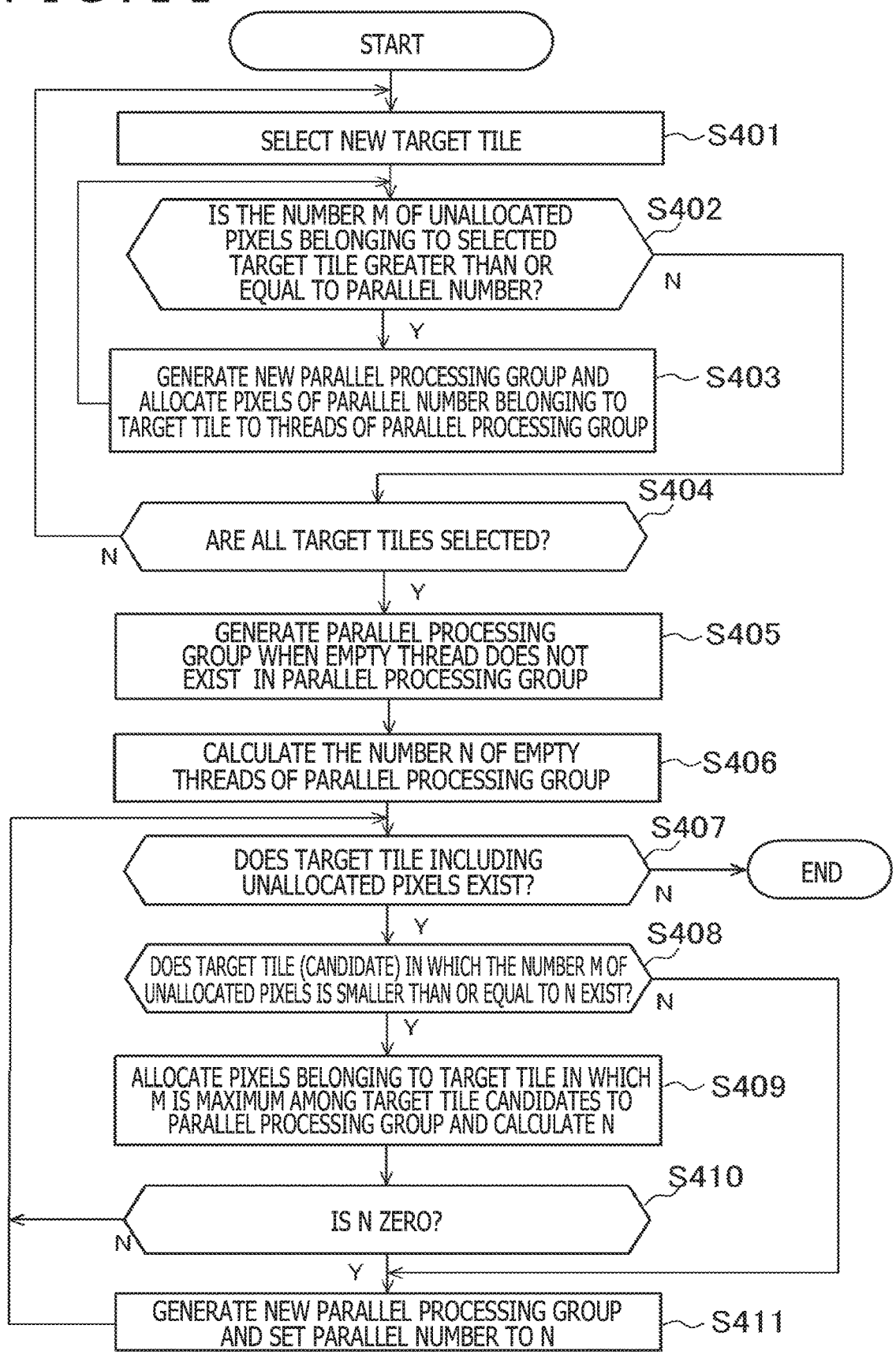
FIG. 11 is a flow diagram illustrating another example of the processes in which the controller allocates pixels to parallel processing groups.

FIG. 11 is a flow diagram illustrating another example of the processes in which the controller 23 allocates pixels to the parallel processing groups 81. The controller 23 performs the processes illustrated in FIG. 11 for each target tile of the predetermined number of buffers. More concretely, the controller 23 buffers the target tiles of the number of buffers in a local memory etc. Further, the controller 23 performs the processes illustrated in FIG. 11 on the buffered target tiles. Further, until the target tiles no longer exist, the controller 23 repeats the processes illustrated in FIG. 11.

First, the controller 23 selects a new target tile from among unprocessed target tiles of the buffered target tiles (step S401). Secondly, the controller 23 calculates the number M of the unallocated pixels belonging to the selected target tile. If the number M is greater than or equal to the parallel number (Y in step S402), the controller 23 generates a new parallel processing group and allocates pixels of the parallel number among the unallocated pixels belonging to the target tile to threads of the generated parallel processing group (step S403). Then, the controller 23 repeats the processes from step S402. On the other hand, if the number M is smaller than the parallel number (N in step S402), the controller 23 confirms that all the buffered target tiles are selected (step S404). If all the buffered target tiles are not selected (N in step S404), the controller 23 repeats the processes from step S401. If all the buffered target tiles are selected (Y in step S404), the controller 23 performs the processes of step S405 and subsequent steps.

The processes from step S401 to step S404 are processing in which pixels of a multiple of the parallel number among the pixels belonging to the target tile are allocated to the parallel processing groups 81 for each set of pixels of the parallel number. Thereby, the number of the unallocated pixels belonging to each target tile is smaller than the parallel number.

In step S405, if an empty thread does not exist in the parallel processing group generated before the process of step S401, the controller 23 generates a parallel processing group (step S405). Then, the controller 23 acquires the number N of the empty threads in the parallel processing group for the subsequent processes (step S406).

The controller 23 determines whether or not a target tile including the unallocated pixels exists in the buffered target tiles (step S407). If no target tile exists (N in step S407), the controller 23 completes the processes.

On the other hand, if a target tile exists (Y in step S407), the controller 23 determines whether or not there exists a target tile (hereinafter, described as a "target tile candidate") in which the number M of the unallocated pixels is smaller than or equal to N. If there exists no target tile in which the number M of the unallocated pixels is smaller than or equal to N, the controller 23 skips the processes of steps S409 and S410. On the other hand, if there exists a target tile in which the number M of the unallocated pixels is smaller than or equal to N, the controller 23 allocates pixels belonging to the target tile in which M is the maximum among the target tile candidates satisfying the conditions to the parallel processing groups 81 and recalculates the number N of the empty threads (step S409). Then, if the number N of the empty threads is zero (Y in step S410), the controller 23 generates a new parallel processing group and sets the parallel number as the number N of the empty threads (step S411). Then, the controller 23 repeats the processes from step S407. On the other hand, if the number N of the empty threads is not zero (N in step S410), the controller 23 repeats the processes from step S407 without performing step S411.

Figure 12:
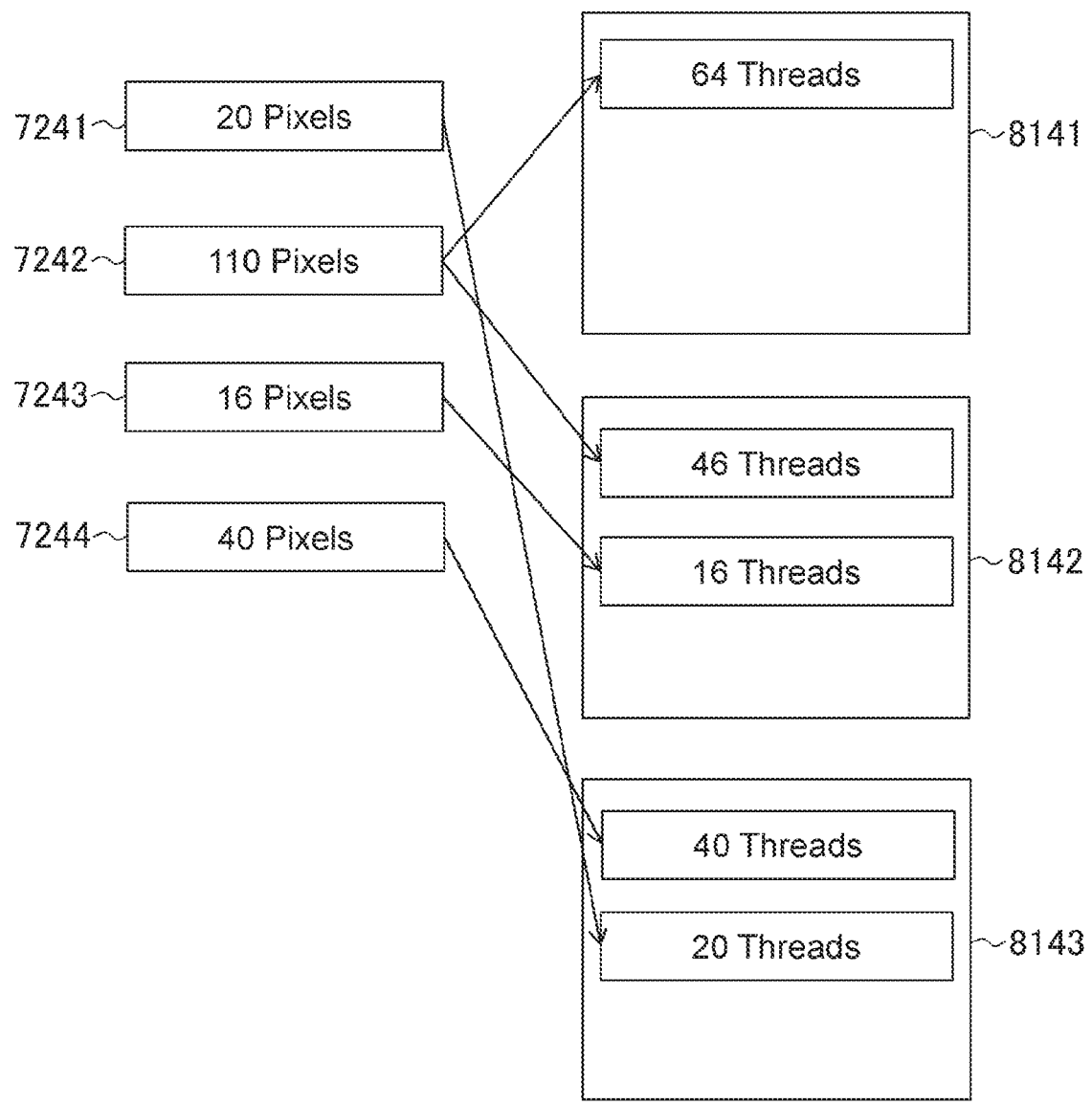
FIG. 12 is a diagram illustrating an example of allocation of the pixels to the parallel processing groups.

FIG. 12 is a diagram illustrating an example of the allocation of pixels to the parallel processing groups 81. FIG. 12 illustrates an example in a case in which the pixels belonging to target tiles 7241, 7242, 7243, and 7244 are allocated to parallel processing groups 8141, 8142, and 8143 through the processes illustrated in FIG. 11. The example illustrated in FIG. 12 is different from that illustrated in FIG. 5 and the pixels belonging to the target tiles whose order numbers are consecutive to each other are allocated to the same parallel processing group 81, and therefore the parallel degree of the processes is improved. For example, when the processes illustrated in FIG. 5 are performed on the target tiles 7241, 7242, 7243, and 7244, the number of the parallel processing groups 81 is four.

In the present embodiment, there is described an example in which the present invention is applied to a case in which the primitive constituting the three-dimensional shape is converted into the two-dimensional area and a color of a pixel on the converted area is calculated. Further, even if the three-dimensional primitive is not converted into the two-dimensional area, the present invention can be applied to the above case. For example, the present invention can be applied even to a case in which texture mapping is performed on the predetermined two-dimensional area.

The invention claimed is:

1. An image processing apparatus comprising:
   a rasterizer configured to determine, for each partial area into which a display area is divided, multiple pixel groups including pixels overlapping a two-dimensional area;
   a memory configured to store color calculation information regarding each position of the two-dimensional area;
   an allocation section configured to allocate the pixels belonging to the multiple pixel groups to any one of multiple processing groups that are each capable of including pixels whose number is smaller than or equal to a predetermined parallel number;
   a parallel calculation unit configured to calculate in parallel each color of the pixels belonging to the processing group on a basis of the color calculation information stored in the memory; and
   an image generation section configured to output image data on a basis of the calculated color, wherein
   the allocation section allocates, for each of the pixel groups, the pixels to at least one of the multiple processing groups such that the number of processing groups to which the pixels belonging to the pixel group are allocated is a necessary minimum number.

2. The image processing apparatus according to claim 1, wherein positions of the color calculation information continuously stored in the memory are not separated from each other.

3. The image processing apparatus according to claim 1, wherein the allocation section, in a case in which the number of pixels allocated to a processing group is smaller than the predetermined parallel number and a number obtained by subtracting the number of the allocated pixels from the predetermined parallel number is greater than the number of unallocated pixels belonging to another pixel group, allocates the pixels belonging to the another pixel group to the processing group.

4. The image processing apparatus according to claim 1, wherein the allocation section:
   calculates as an empty number a number obtained by subtracting the number of pixels belonging to a processing group to which the pixels are allocated immediately before from the parallel number,
   in a case in which a remainder obtained by dividing the number of pixels belonging to a subsequent pixel group by the parallel number is smaller than the empty number, allocates the pixels by the number of the remainder to the processing group to which pixels are newly allocated, and
   in a case in which the remainder obtained by dividing the number of the pixels belonging to the subsequent pixel group by the parallel number is greater than the empty number, allocates the pixels belonging to the subsequent pixel group to one or multiple new processing groups.

5. The image processing apparatus according to claim 1, wherein the allocation section:
   allocates pixels of the parallel number included in a pixel group in which the number of pixels is greater than the parallel number to respective processing groups,
   in a case in which the number of pixels of any one of the pixel groups having unallocated pixels is smaller than or equal to an empty number of a processing group, allocates the unallocated pixels belonging to the any one of the pixel groups to the processing group, and in a case in which all the numbers of the pixels of the pixel groups having the unallocated pixels are greater than the empty number of the processing group, generates a new processing group to which the pixels of any one of the pixel groups are allocated.

6. An image processing method of an apparatus, the apparatus including a memory configured to store color calculation information regarding each position of a two-dimensional area and a parallel calculation unit configured to calculate in parallel each color of pixels belonging to multiple processing groups that are each capable of including pixels whose number is smaller than or equal to a predetermined parallel number on a basis of the color calculation information stored in the memory, the image processing method comprising:

determining, for each partial area into which a display area is divided, multiple pixel groups including pixels overlapping the two-dimensional area;

allocating the pixels belonging to the multiple pixel groups to any one of the multiple processing groups; and outputting image data on a basis of the color calculated by the parallel calculation unit, wherein in the allocating the pixels, for each of the pixel groups, the pixels are allocated to at least one of the multiple processing groups such that the number of the processing groups to which the pixels belonging to the pixel group are allocated is a necessary minimum number.

7. A non-transitory, computer-readable storage medium containing a computer program for execution by a computer, the computer including a memory configured to store color calculation information regarding each position of a two-dimensional area and a parallel calculation unit configured to calculate in parallel each color of pixels belonging to multiple processing groups that are each capable of including pixels whose number is smaller than or equal to a predetermined parallel number on a basis of the color calculation information stored in the memory, and the computer outputting image data on a basis of the color calculated by the parallel calculation unit, where the computer, when executed by the computer, causes the computer to carry out actions, comprising:

determining, for each partial area into which a display area is divided, multiple pixel groups including pixels overlapping the two-dimensional area; and allocating the pixels belonging to the multiple pixel groups to any one of the multiple processing groups;

wherein in the allocating the pixels, for each of the pixel groups, the pixels are allocated to at least one of the multiple processing groups such that the number of processing groups to which the pixels belonging to the pixel group are allocated is a necessary minimum number.

\* \* \* \* \*